United States Patent [19]

Spanek et al.

[11] 4,027,583

[45] June 7, 1977

[54] RACK FOR SUPPORTING POULTRY AND MEAT DURING ROASTING

[76] Inventors: George Spanek, 212 Eaton Road, San Mateo, Calif. 94402; Denis C. Spanek, 19135 Brooklane, Saratoga, Calif. 95070

[22] Filed: June 28, 1976

[21] Appl. No.: 700,566

[52] U.S. Cl. .............................. 99/421 H; 99/345; 99/426; 99/444; 126/30; 211/181
[51] Int. Cl.² ...................................... A47J 37/04
[58] Field of Search ......... 99/421 H, 345, 419–420, 99/426, 444–445, 446, 450; 126/25, 30; 211/27, 133, 181

[56] References Cited

UNITED STATES PATENTS

| | | | |
|---|---|---|---|
| 849,290 | 4/1907 | Vanderbilt | 99/426 |
| 1,938,466 | 12/1933 | Rubenstein | 211/181 X |
| 2,127,658 | 8/1938 | Walterspiel | 99/345 |
| 3,211,082 | 10/1965 | Sachnoff et al. | 99/444 |
| 3,244,128 | 4/1966 | Rogalski et al. | 211/133 X |
| 3,392,665 | 7/1968 | Harnest | 99/426 |
| 3,532,318 | 10/1970 | Lloyd | 211/181 X |

*Primary Examiner*—Harvey C. Hornsby
*Assistant Examiner*—Arthur O. Henderson
*Attorney, Agent, or Firm*—Julian Caplan

[57] ABSTRACT

A wire rack which fits in a pan within an oven supports poultry and meat during roasting so that grease and fat and particularly water within the body cavity of the dressed poultry runs into the pan. The rack consists of a first member having a round base and preferably eight wire members distributed around the base each in a vertical plane and curving inward and then straight up so that they define a cylinder. A ring prevents the eight members from spreading. A second member comprises a top ring and a plurality of depending wires each about half the length of the first-mentioned wire members and each lying in a vertical plane and extending inward and then straight down, the lower ends of pairs of wires being joined. The lower end of the second member fits into the top of the first member. An annular trough snaps over the top ring and is formed with small holes so that juices placed in the trough baste meat in the rack. Poultry, chops, rib racks, bacon, chains of link sausage and a variety of other meats are supported as described in detail.

4 Claims, 6 Drawing Figures

U.S. Patent June 7, 1977 Sheet 1 of 2 4,027,583
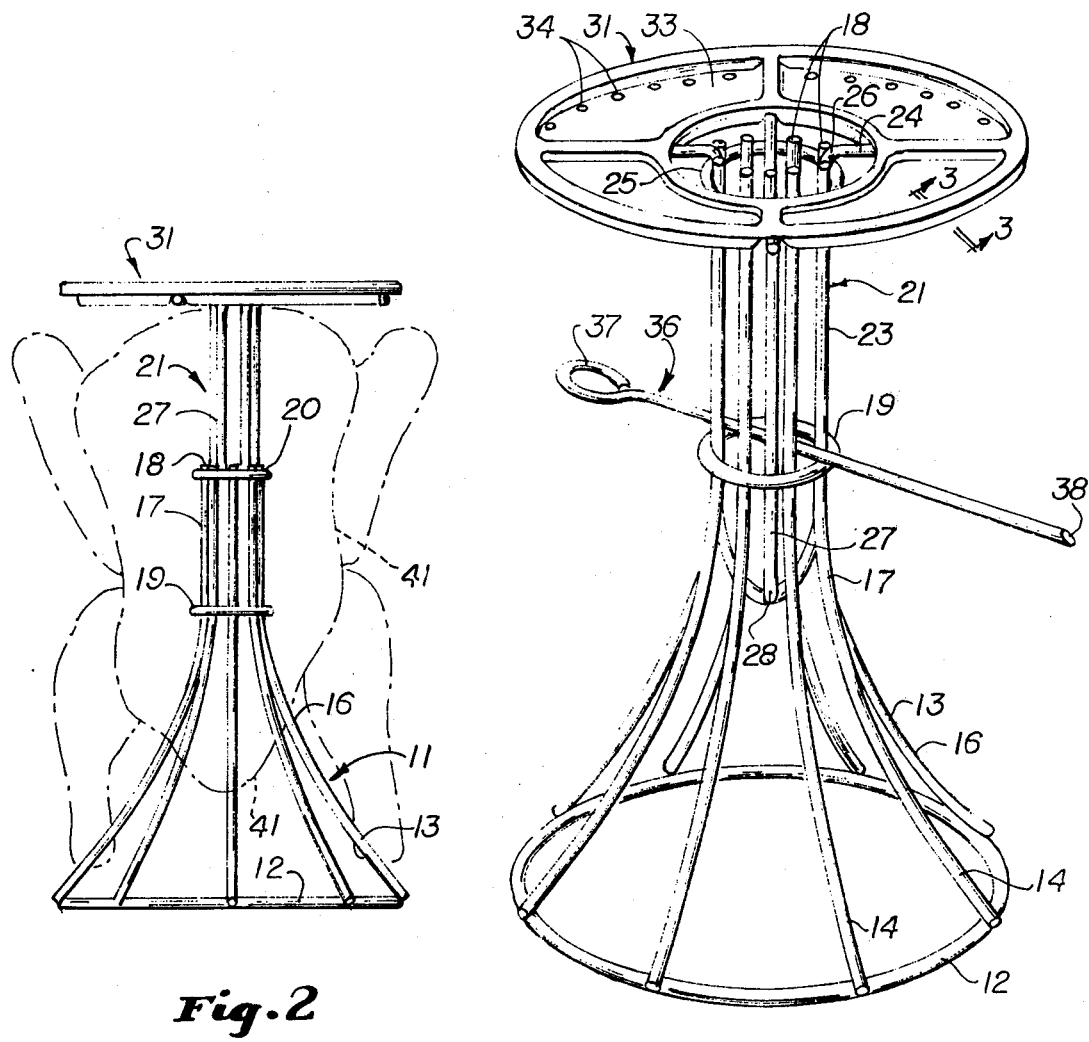
Fig. 1
Fig. 2
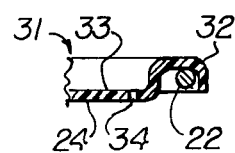
Fig. 3

RACK FOR SUPPORTING POULTRY AND MEAT DURING ROASTING

This invention relates to a new and improved rack for supporting poultry and meat during roasting. The rack supports poultry and meat in an oven so that grease and fat run down into a pan. Provision is made, however, for lifting juices from the pan into a trough having small holes and being located so that the juices baste poultry and other meats on the rack. Frozen and cold storage poultry tend to retain ice and water within the body cavity when the poultry is placed flat in roasting pans and the like. The heat of the oven, in such prior methods of roasting, penetrates the body cavity from the outside and hence frequently the water and ice within the body cavity are not evaporated and do not drain. Accordingly, uneven cooking of the poultry results. In accordance with the present invention, dressed poultry is supported on the rack, which is the subject of this invention, with the opening of the body cavity downward. Thus heat is directed both interiorly and exteriorly of the poultry causing uniform cooking; and further, the water and other juices within the cavity drain out of the bottom opening. Cooking of the poultry is improved thereby. At the same time, a trough is provided which is supported above the poultry and formed with small holes. The juices which collect in the pan below the poultry may be raised to the trough and allowed to drop through the holes to baste the poultry.

It is, accordingly, among the principal objects of this invention to provide for supporting and holding poultry to subject same to uniform heat and to improve the crispness and taste of the product. Further, burning of parts of the carcass which are normally in contact with the bottom of the pan is eliminated.

In addition to poultry, other meats may held conveniently for oven cooking. Thus chops and rib racks may be supported in substantially vertical planes improving the quality of the finished product over broiling, grilling and pan frying. Bacon may be hung from the rack so that the fat drains and crisp lean meat results. Additionally, chain links of sausage may be spiral wrapped around the rack, allowing the grease to drain.

One of the principal features of the invention is that supporting poultry in substantially vertical position enables more meat to be cooked in an oven at the same time and by conventional methods wherein poultry are placed flat in a pan. By permitting more meat to be cooked at the same time, energy in heating the oven is conserved.

A further feature of the invention is the fact that a wide variety of different meat products may be held by the rack, all being supported in such fashion that more meat may be cooked in an oven of given dimension than as heretofore been possible.

Other objects of the present invention will become apparent upon reading the following specification and referring to the accompanying drawings in which similar characters of reference represent corresponding parts in each of the several views.

In the drawings:

FIG. 1 is a perspective view of the rack showing the trough attached.

FIG. 2 is a schematic side elevational view showing the rack used to support poultry during roasting.

FIG. 3 is a fragmentary sectional view taken substantially along the line 3—3 of FIG. 1.

Figure 4:
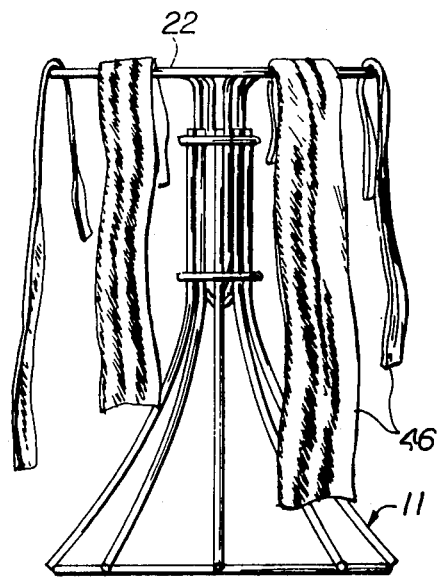
FIG. 4 is a perspective view showing the rack used for cooking bacon.

The rack of the present invention comprises a lower member 11 and an upper member 21 which telescopes therein. Lower member 11 is formed with a large diameter base ring 12 of wire. Spaced equally around the circumference of ring 12 are bottom rods 13, each of which is in a vertical plane, the planes intersecting along a vertical axis through the center of ring 12. The rods 13 are welded by means of welds 14 to the ring 12. Each rod 13 has a hyperbolic curve 16 curving inwardly and upwardly from ring 12 and merging into a substantially vertical portion 17 terminating in upper ends 18. A ring 19 surrounds the rods 13 about midway of their height and a second ring 20 at the upper ends of rod 13.

Top member 21 also has an outer ring 22 of about the same diameter as ring 12. Welded at circumferentially spaced position around the circumference of ring 22 are top rods 23. In the preferred form shown in the accompanying drawings, there are eight rods 13 and four rods 23 but this arrangement is subject to variation. Each rod 23 comprises an inward extending horizontal portion 24 and then an approximately right angle bend 26 below which is a vertical portion 27. Pairs of rods 23 are connected together by U-shaped bends 28 at the bottom. To rigidify the structure, a top ring 26 surrounds the rods 23 immediately below the bends 26. As is apparent from the accompanying drawings, the spacings are such that the rods 23 fit within the vertical portions 23 of the rods 13. Further, the arrangement of the top member 21 is such that it is telescopically received in the lower member 11. Directing attention to FIG. 2, it will be understood that poultry is of different sizes and the telescopic arrangement of the top member 21 permits it to rest on top of the bird and permits variations in sizes.

A detachable annular trough 31 is provided for top member 31. Trough 31 has a peripheral lip 32 which snaps over the outer ring 22. Inwardly of ring 22 are depressions 33 which are located between the horizontal portions 24 of the rods 23. Small holes 34 are formed in the bottom of depressions 33. Gravy or juices placed in the depressions 33 of trough 31 drip from the holes 34 down on to the poultry. However, as is hereinafter explained, it is sometimes undesirable to have the trough 31 in place and hence it is made removable.

For certain purposes, one or more skewers 36 may be used, preferably each having a ring head 37 and a sharpened point 38.

A principal use of the device is to roast chickens, as shown in FIG. 2. The top member 21 is removed and the chicken inserted over the upper ends 18 of the bottom rods 13. The chicken has been eviscerated and no stuffing is used. Hence the opening 42 at the bottom of the cavity of the chicken 41 permits entry of the rods 13. The top member is inserted through the neck opening of the poultry and rests upon the upper end of the bird. It is thus seen that the poultry is supported in vertical position and preferably the racks are placed on individual pans or a single pan for a plurality of racks is used. The vertical position of the carcass permits drainage of moisture from a body cavity. Also, the opening 42 being downward and the wires of the rods 13 directing the heat upwardly and inwardly, the poultry is cooked both from the inside and outside. Juices and water drain out. Where it is desired to baste the fowl, the trough 31 is installed and periodically juices are lifted from the bottom pan (not shown) into the depressions 33 where they drip through the holes 34 to baste the fowl.

Directing attention to FIG. 4, the device is used to cook bacon. For this purpose, the trough 31 is removed. The upper ends of the bacon 46 are draped over the top ring 22. The bacon hangs vertically and the grease drips off of it into the pan (not shown) below the lower member 11.

Figure 5:
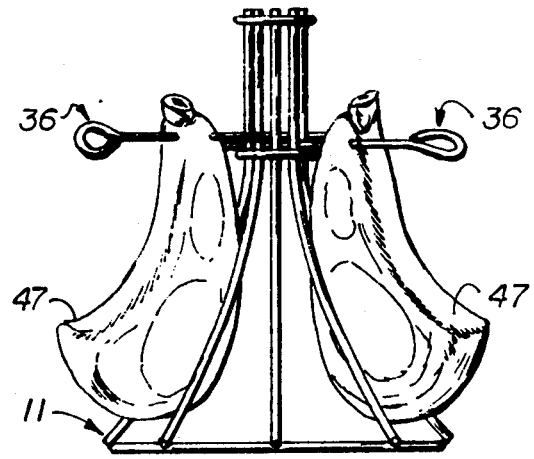
FIG. 5 is a perspective view showing the rack used to cook chops.

In FIG. 5, the device is shown to support chops 47 in vertical planes. The chops are inserted between the rods 13 and skewers 36 may be used to hold them upright. It is not necessary to use the top member 21 in this usage of the rack. Racks of ribs and other meats may be used instead of the chops 47 in this mode.

Figure 6:
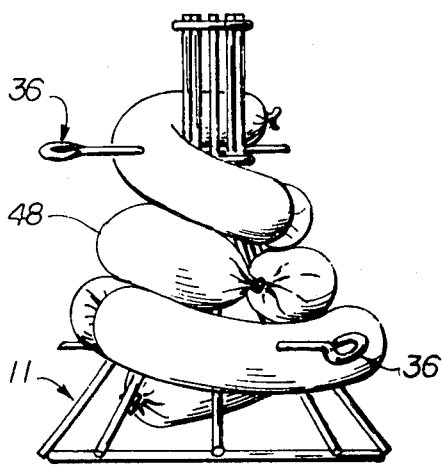
FIG. 6 is a perspective view showing a chain of link sausages wrapped around the rack.

In FIG. 6, a chain of links of sausage is wrapped in spiral form around the rack.

In all of these usages of the invention, it will be seen that less oven area is required than in conventional cooking and hence more meat may be cooked, thereby preserving energy.

What is claimed is:

1. A rack for supporting food products during cooking comprising a lower member and an upper member fitting telescopically into the upper end of said lower member, said lower member comprising a base ring, a plurality of bottom rods spaced around the circumference of said base ring and secured thereto, each said bottom rod curving inwardly and upwardly from said base ring in a plane normal to the plane of said base ring, the upper stretch of said bottom rod being substantially vertical for an extended portion of its length, a first ring fixed to said bottom rods at about the midpoints of their lengths and a second ring fixed to the upper ends of said bottom rods; said upper member comprising an outer ring of a size about equal to said base ring, a plurality of top rods spaced around the circumference of said outer ring and secured thereto, each said top rod extending substantially horizontally inward from said outer ring and then curving downward to fit inside said second ring and between the upper ends of said bottom rods, the lower ends of opposed pairs of top rods being joined together in lower bends; and a detachable, perforated trough fitting on top of said upper member shaped to receive liquid which drips through the perforations in said trough to baste said food products.

2. A rack according to claim 1 in which said trough is annular and disposed substantially horizontal, the outer edge of said trough being curled downward to snap over the top and outside of said outer ring to hold said trough in place.

3. A rack according to claim 1 in which said trough is formed with depressions between the horizontally disposed stretches of said top rods to provide perforated wells for juices.

4. A rack according to claim 1 which further comprises at least one skewer to fit horizontally through said bottom rods and rest on said first ring.

* * * * *